United States Patent [19]

Brown

[11] Patent Number: 4,656,553

[45] Date of Patent: Apr. 7, 1987

[54] ELECTRONICALLY PROGRAMMABLE UNIVERSAL BRUSHLESS DC FAN WITH INTEGRAL TRACKING AND LOCKED ROTOR PROTECTION

[75] Inventor: Fred A. Brown, Woodstock, N.Y.

[73] Assignee: Comair Rotron, Inc., Saugerties, N.Y.

[21] Appl. No.: 821,059

[22] Filed: Jan. 21, 1986

[51] Int. Cl.[4] .............................................. H02H 7/08
[52] U.S. Cl. ..................................... 361/31; 318/254;
       318/334; 361/25; 361/33
[58] Field of Search ...................... 361/23, 25, 27, 31,
       361/33; 318/334, 471, 254

[56] References Cited

U.S. PATENT DOCUMENTS

| | | | |
|---|---|---|---|
| 2,424,344 | 7/1947 | Veinott | 318/334 |
| 2,659,852 | 11/1953 | Trevitt | 318/334 |
| 2,776,397 | 1/1957 | McWilliams | 318/328 |
| 2,991,405 | 7/1961 | Carlson | 318/471 |
| 3,196,629 | 7/1965 | Wood | 318/334 |
| 3,346,772 | 10/1967 | Mierendorf | 361/27 |
| 3,381,199 | 4/1968 | Persson | 318/327 |
| 3,384,801 | 5/1968 | Rodgers | 318/334 |
| 3,396,323 | 8/1968 | Auld | 318/331 |
| 3,426,265 | 2/1969 | Till | 361/57 |
| 3,478,532 | 11/1969 | Cootey | 318/334 |
| 3,544,236 | 12/1970 | Brookmire | 318/471 |
| 3,590,365 | 6/1971 | Nelson | 323/19 |
| 3,728,702 | 4/1973 | Miyamoto | 340/228 R |
| 3,777,240 | 12/1973 | Neill | 318/471 |
| 3,794,896 | 2/1974 | Holt | 318/471 |
| 3,864,605 | 2/1975 | Kühnlein et al. | 361/27 |
| 3,896,359 | 7/1975 | Olander | 318/334 |
| 3,909,675 | 9/1975 | Hirsbrunner et al. | 361/27 X |
| 3,988,652 | 10/1976 | Endo | 318/138 |
| 4,034,274 | 7/1977 | Akima | 318/334 |
| 4,179,899 | 12/1979 | Katayama | 318/473 |
| 4,266,257 | 5/1981 | Rudich, Jr. | 36/27 |
| 4,313,402 | 2/1982 | Lehnhoff | 318/471 |
| 4,365,187 | 12/1982 | McDaniel | 318/254 |
| 4,430,681 | 2/1984 | Benzig | 361/27 |

OTHER PUBLICATIONS

F. A. Brown, Brushless DC Airmovers Interface with the Design Engineer, Motorcon Mar. 1982 Proceedings, pp. 673-683, 664-665.

Primary Examiner—A. D. Pellinen
Assistant Examiner—Jeffrey A. Gaffin
Attorney, Agent, or Firm—Bromberg, Sunstein & McGregor

[57] ABSTRACT

A brushless DC fan with a winding supply circuit having an internal voltage regulator can afford current limiting and thermal protection and provide various desired fan speeds without alteration of the basic fan circuit, the windings, or other manufacturing items. A voltage setting circuit element can set fan speed externally and can be used to establish various fan speeds. An internal voltage establishing circuit element sets the maximum speed. The regulator replaces the fan's protective thermistor to shut down the voltage to the windings when locked rotor occurs. Bringing out a lead for the purpose of connecting a speed controlling resistor, thermistor, or active programming means to the internal circuitry enables the fan's end user to alter operation as needed.

16 Claims, 4 Drawing Figures

ELECTRONICALLY PROGRAMMABLE UNIVERSAL BRUSHLESS DC FAN WITH INTEGRAL TRACKING AND LOCKED ROTOR PROTECTION

BACKGROUND OF THE INVENTION

This invention relates to brushless DC fans, which is to say fans driven by brushless DC motors, and more particularly to such fans that have a circuit permitting operation of the fan over a range of voltages, allowing fan speed and air delivery to be programmed, making available temperature tracking, limiting current, and affording locked rotor protection.

Brushless DC fans are increasingly popular for such applications as cooling electronics. A fan of a given size may have more than one operating voltage. That is, a given fan size may be available in both 12 and 24 volt models. For a particular fan size of a particular operating voltage, different air flow requirements can dictate the use of different motor windings, electronics, and protection circuitry. These differing fan characteristics among fans that appear identical in size, housing layout, venturi, and impeller raise difficulties in manufacturing control and add cost as compared to the production of a single fan model with consistent windings and circuitry. Frequently, fan customers inventory several different model fans to meet the varied requirements among their varied products. Considerable simplification of manufacturing by the fan maker, and of ordering and stocking by the customer could be effected if a single standardized brushless DC fan could be provided for a particular desired fan size and input voltage and if a means of programming that fan's operating characteristics could be utilized to simply set the operational characteristics of the fan for its particular rated voltage without winding changes and without extensive circuit modifications. This also would have the benefit of enabling the manufacturer to respond quickly to customer orders either from inventories or by rapidly increasing current production without time-consuming production line changes.

In past brushless DC fans, locked rotor protection was afforded by a positive temperature coefficient (PTC) thermistor that was in series between the windings and the input connections to the fan. The thermistor was supported in close proximity to the stator on a circuit board. The circuit board, in addition, supported the commutation sensing device that controlled stator winding energization and the stator winding energization circuit that directed flow of direct current to the windings under control of the commutation sensing device. The increased temperature that arose with a locked rotor caused the thermistor resistance to increase significantly and reduce the current to the particular stator winding when, in the locked rotor condition, the impeller was immobilized.

For the purpose of limiting current to a fan during start up, or in a locked rotor condition, or for varying the voltage applied to a brushless DC fan, the inventor has, in the past, suggested an external voltage regulator. But both fan current limiting and voltage regulation by one voltage regulator were not suggested, particularly by internal fan circuitry. An integrated circuit like the Motorola LM117, LM217 or LM317 was suggested for use as a power supply for fans for cooling electronics. This circuit is a three-terminal device that has an output voltage dependent on a voltage established at an "adjust" terminal thereof. Fan customers, it was suggested, could choose a value of resistance between that terminal and ground to provide the desired air flow for cooling. The use of a thermistor as the resistance element connected to the adjust terminal of such a separate regulation circuit could be used to monitor temperature and adjust fan speed based on the monitored temperature.

In brushless DC motors it has long been recognized that the need for a commutation and energization circuit that controlled energization of the stator windings was a commercial impediment by virtue of its increasing the cost of these motors vis-a-vis AC motors or brush-type DC motors that require no such circuitry. This has been true of brushless DC fans. There has been, therefore, a continuing effort to minimize the cost of such circuitry such that fewer and less expensive circuit components have been chosen to reduce the overall cost of brushless DC fans. Moreover, competition for brushless DC fans has been primarily price competition, and this too has led away from additions to the internal fan circuitry.

SUMMARY OF THE INVENTION

A brushless DC fan according to this invention includes, in current supplying relation to the fan motor windings, a current limiting winding supply circuit that includes a winding voltage establishing, programmable voltage regulator on the internal circuit board that carries the fan's circuitry. The regulator is a commercially available integrated circuit (IC). The regulator provides thermal protection adequate to protect the fan motor in a locked rotor condition. In addition, for fans of a particular size, this winding supply circuit allows the same basic circuitry and an identically wound stator to be used for various fan current ratings and speeds. The fan manufacturer can select fan speed by the choice of a single internal circuit element, or the end-user can set the speed by connecting just one circuit element externally, using a lead or connector specially provided for that purpose. Using a microprocessor and digital to analog converter or another control that may be a part of the electronics cooled by the fan, the fan user can program fan speed to afford the various air flow requirements that various operations of the equipment may require. Alternatively, connection of only a thermistor, as the external resistance that sets the voltage regulator output, allows the fan to respond to temperature changes at the thermistor's location, increasing speed in response to higher temperatures.

Because of the multiple functional benefits of the winding supply circuit of this invention, the regulator IC can be introduced without greatly increasing the cost of the brushless DC fan. In a preferred embodiment, the voltage regulator and its related circuit elements, are added to the internal PC board, but they replace a positive temperature coefficient thermistor, and therefore the parts cost increase is small. Other less apparent savings are afforded by this change in internal circuitry. These further significantly reduce the cost of adding the voltage regulator and associated circuit elements. Ultimately, a manufacturing cost saving should result from the winding supply circuit additions. By using the voltage regulator to determine fan speed, just one basic set of stator windings and a standard circuit for a particular fan size and voltage rating can replace the variations that were previously provided for the purpose of offering fans of various rated voltages and speed in a given fan size. With the present invention, in a fan of a particular size and input voltage, there is no longer a need to wind a stator differently for different speeds. In the past, to change speed, the production line was stopped while winders were changed over to a different number of turns of different size wire. Elimination of these stoppages increases efficiency and reduces cost. With the invention the windings that previously called for the fewest turns of the heaviest wire are now wound on every stator of the motor of a particular fan size. This saves manufacturing time per stator since less winding time is needed. This also saves cost since heavier wire is less costly per pound. The wire can be purchased in greater quantities, which means lower price, and simpler purchasing and inventorying. In fact, the use of this winding supply circuit to determine fan speed permits, for a fan of a particular input voltage, a speed not previously possible by choice of windings, because insufficient space existed to wind the stator with the requisite turns of appropriately sized wire.

The winding supply circuit's IC voltage regulator, which is like that previously suggested for use externally of a fan as a supply in addition to all of the fan's internal circuitry, has an adjust terminal that enables its output voltage to be chosen based on the voltage at the adjust terminal. Selection of a resistor or a Zener diode for connection between the adjust terminal and ground will determine the regulator's output voltage, the voltage applied to the fan motor's stator windings and, therefore, the fan speed. The winding supply circuit uses a resistor in series between the regulator and the stator windings for current limiting. If excessive current is drawn, as occurs during fan motor start up or in the event of locked rotor, then the voltage across the resistor is used to reduce the output voltage of the voltage regulator. When locked rotor occurs, the voltage reduction is so great as to effect a maximum voltage drop from the input to the output of the regulator and this causes the regulator's thermal protection to shut down the regulator.

In addition to the ordinary two power supply leads, a single lead from the adjust terminal of the voltage regulator, brought to the exterior of the fan housing, permits the user's control of the fan in the many ways mentioned above, by connection of the speed setting resistor, or the speed varying thermistor, or the control provisions. If, for example, the fan is to be run at low speed or not at all during a stand-by condition of the equipment to be cooled, a low resistance applied between the external adjust terminal lead and ground will accomplish that. Where fans cool microprocessor based circuitry or other digital circuitry, programmed resistance can increase or decrease the winding voltage of the winding supply circuit to increase or decrease fan speed as needed. For this purpose a digital to analog converter can be used and speed can be tailored to the equipment's anticipated cooling needs. Even the use of a single resistor to set a fixed fan speed permits the fan user to select less than the highest available speed if adequate. Noise and power consumption are then reduced commensurately.

An internal resistor or Zener diode connected to the internally housed voltage regulator IC can be used by the fan manufacturer to set the maximum fan speed at which the fan will operate, should the purchaser choose not to tailor its operation. The manufacturer can choose a resistance to set the voltage drop across the current limiting resistor used to drop the voltage adjust terminal voltage that sets the regulator's ouput voltage. In this way the maximum current can be chosen. Because the winding supply circuitry with its regulator IC is mounted on the fan motor printed circuit board, internally of the fan housing, no cumbersome external circuitry accompanies the fan to limit current and set speed. When the winding supply circuit supplies the fan motor windings with a voltage less than the input voltage, the regulator provides constant fan speed in the face of varying input voltages by virtue of the regulated voltage supplied to the windings.

Where fans of any kind are used to cool electronics, the electronics manufacturer typically prefers the fan that is least noticeable. That is to say, the fan that generates the least noise, occupies the least space, and consumes the least power, while providing the needed cooling, is the fan that is most attractive to the electronics manufacturer. If a fan of the exact speed is not available, then an electronics manufacturer must use a fan with an air flow rated above the minimum needed to assure adequate cooling, but if that same fan can be tailored to the manufacturer's exact speed requirement, then less power can be consumed and less noise can be generated.

The foregoing savings and advantages in both manufacturing and use of these fans are believed adequate to justify the addition to the internal fan circuit even though that might appear to run contrary to the conventional wisdom that calls for simplification and cost reduction in the circuit.

BRIEF DESCRIPTION OF THE DRAWINGS

The foregoing features and advantages of the present invention will be more apparent from the following detailed description of a preferred embodiment taken in conjunction with the accompanying drawings in which.

DETAILED DESCRIPTION OF THE PREFERRED EMBODIMENTS

Figure 1:
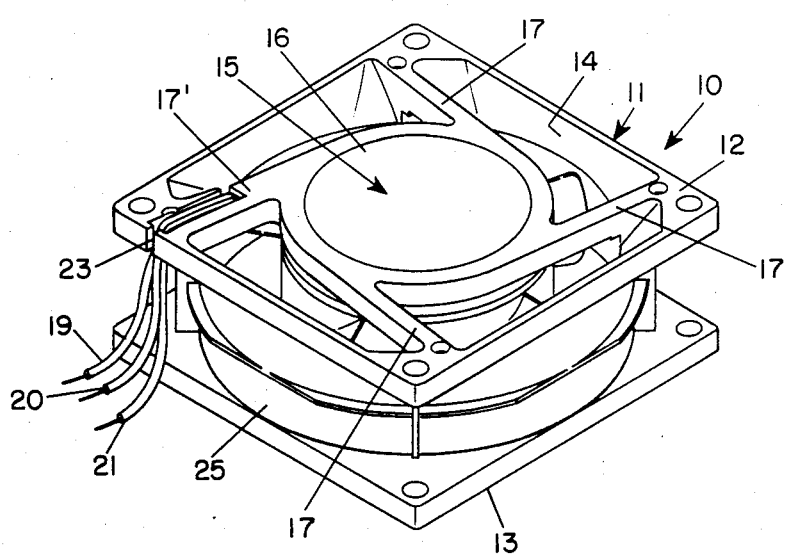
FIG. 1 is a perspective view of a fan according to this invention with a fan performance programming lead available externally in addition to the two input voltage leads.

In FIG. 1, a brushless DC fan 10 includes a housing 11 with a front surface 12, a rear surface 13, and a venturi 14 extending between the front and rear surfaces. The motor, generally designated 15, is centrally located. Its stator and circuit are supported in fixed relation to the housing 12 in a central housing portion 16 connected to the venturi by struts 17 of a spider structure. Leads 19, 20 and 21 are brought out from the motor electronics along one strut 17' specially formed for this purpose with a longitudinal channel leading to a narrow groove 23 at the outer periphery of the motor housing 12. The groove retains the leads in the channel while directing them toward the generally cylindrical exterior 25 of the housing 11 as shown.

Figure 2A:
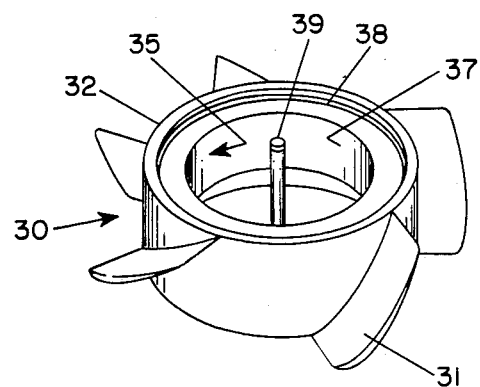
FIG. 2a is a perspective view of the impeller of the fan of FIG. 1.
Figure 2B:
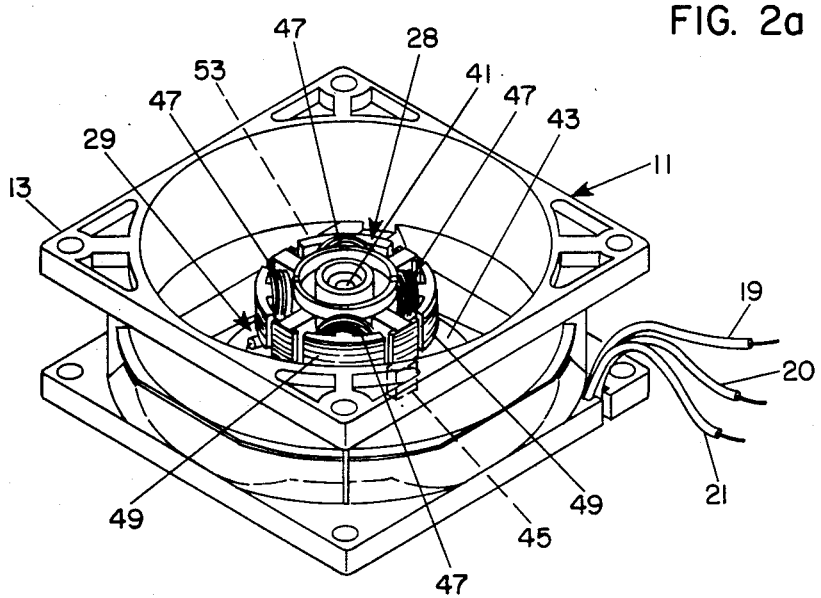
FIG. 2b is a perspective view of the stator, circuit board, venturi, and housing of the fan of FIG. 1.

FIGS. 2a and 2b show the rotational and stationary parts of the fan of FIG. 1 separated. FIG. 2b shows the housing 11, a stator 28, and circuitry 29 of the fan 10 of FIG. 1, inverted from their FIG. 1 position. FIG. 2a illustrates the impeller 30 of the fan 10 of FIG. 1. The impeller includes fan blades 31 supported on a hub 32, for example of plastic, in turn secured to the rotor 35 of the fan's motor. The rotor 35 has an annular permanent magnet 37 in a steel cup 38. A central shaft 39 secured to the end face of the cup 38 is received in bearings 41 in the stator assembly of FIG. 2b when the fan 10 is assembled.

In FIG. 2b, the fan circuitry 29 is mounted on a circular printed circuit board 43. For the purpose of commutation, a Hall sensor 45 is supported on the PC board 43 where it will be located inside the magnet 37, just opposite a commutation portion of that magnet used to control switching of current to windings 47 on the stator as described, for example, in the applicant's earlier U.S. Pat. No. 4,494,028. This, in FIG. 2a, is the portion of the magnet 37 nearest the open end of the cup. A field magnet portion of the magnet 37 interacts with poles 49 of the stator to effect rotation of the impeller upon proper commutation of the energizing current to the windings 47 of the stator. Leads 19 and 20 supply the electrical power that activates the circuit 29 and energizes the windings 47. The lead 21 is used to tailor the operation of the fan to the end user's particular needs in the manner of this invention as described below in greater detail.

Figure 3:
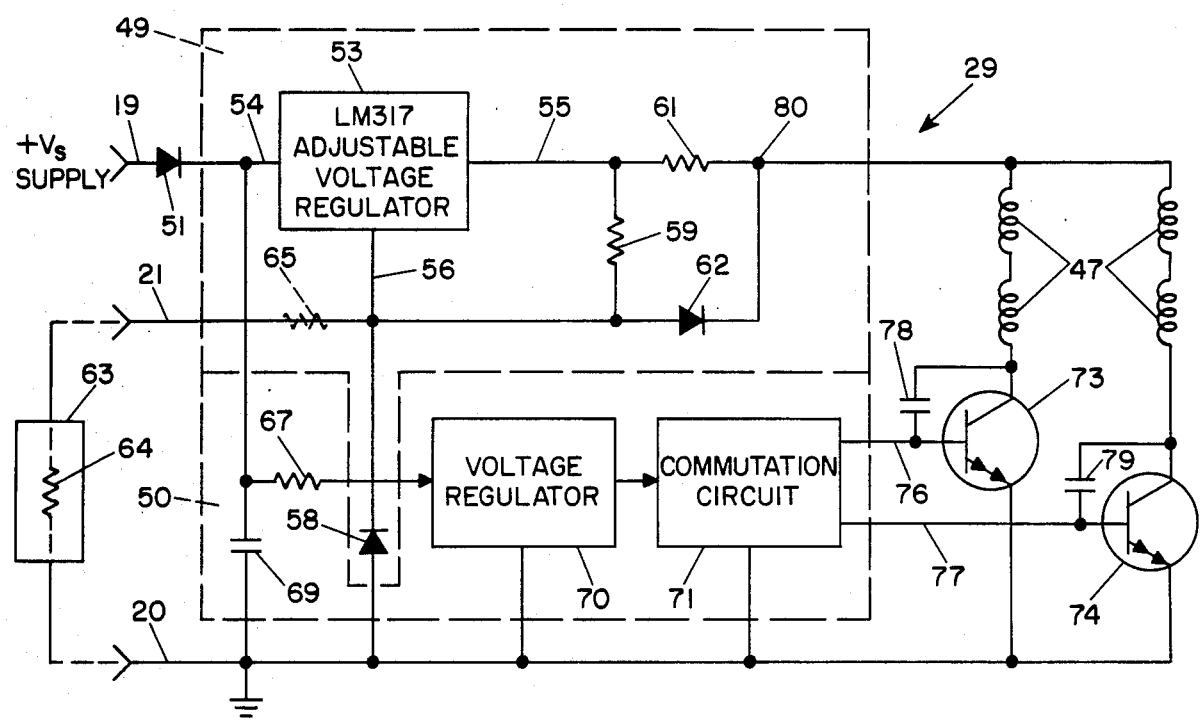
FIG. 3 is a circuit diagram illustrating the preferred internal fan circuit with a variable or programmable voltage regulator IC in a winding supply circuit.

Turning to FIG. 3, the leads 19 and 20 supply the fan circuit 29 with supply voltage $V_s$. The fan circuit 29 comprises a winding supply circuit 49 and a switching circuit 50. The lead 19 supplies the high side or positive $V_s$ supply voltage via a protective diode 51 to both circuits. In the winding supply circuit 49, $V_s$ is supplied to the input of a voltage regulator IC 53 that is on the PC board 43 of FIG. 2b. The regulator 53 can be a commercially available integrated circuit such as the LM317 available from Motorola. The winding supply circuit of FIG. 3 affords both voltage and current regulation. The regulator IC is a three terminal device that has, in addition to its input terminal 54, an output terminal 55, and an adjust terminal 56. A Zener diode 58 establishes the maximum voltage at the adjust terminal 56. The voltage at the adjust terminal 56 sets the output voltage of the regulator 53 at the output terminal 55. With an appropriate input voltage applied and an appropriate resistor 59 connected between the regulator's adjust and output terminals, 56 and 55, the integrated circuit voltage regulator 53 has an output voltage about 1.25 volts higher than the voltage at the adjust terminal 56. The total IC output voltage $V_{out}$, which is measured from the output terminal 55 to the ground or negative line 20, is the sum of this voltage and the voltage drop across a Zener diode 58.

A resistor 61 and a diode 62 serve the current limiting purposes of the winding supply circuit. The voltage drop across the resistor 61 is proportional to the current being drawn by the stator windings. When current increases to a certain, chosen level, the drop across the resistor 61 becomes sufficient for the diode 62 to begin to conduct, referencing the voltage at the adjust terminal 56 to the decreased voltage at the junction of the resistor 61 and the windings 47. The decrease in voltage at the adjust terminal 56 reduces the output voltage from the regulator IC, limiting the current to the windings.

To set the fan of FIG. 3 at less than the maximum speed provided by the Zener diode 58, a programming element or means 63 such as the external resistor 64 is connected between the external lead 21 provided for that purpose and the external lead 20. The external resistor 64 can be applied by the fan purchaser. The voltage $V_{out}$ at the output is then 1.25 volts above the voltage $V_{adj.}$ at the adjust terminal 56 as established by the resistors 59 and 64 acting as a voltage divider and establishing a $V_{adj.}$ below the Zener voltage or breakdown voltage of the Zener diode 58. Thus the speed of the brushless DC motor is controlled by the voltage regulator 53 and its programming element 63.

In another way of using this programmable fan, the programming element 63 can be a positive temperature coefficient thermistor wired into the energization circuit by the leads 21 and 20. The thermistor can be alone or in conjunction with a speed setting resistor 64. The thermistor can be located where temperature increases or is most critical, so that an increase in its temperature raises the voltage $V_{out}$ and increases fan speed until the temperature returns to a lower value. The fan user can choose a more elaborate manner of fan speed control if desired. Where, for example, the fan is used to cool digital electronics and microprocessor control is available, then the fan programming element 63 can be microprocessor controlled resistance of the nature of a digital to analog converter. Using this technique, the fan user might choose to turn the fan off or operate it at a minimum speed during an inoperative or standby condition of the equipment being cooled. Various fan speeds can be tailored to various operations of the equipment being cooled based on the programming of the microprocessor. Only the needed air flow would be provided for any particular operation, and higher power demands and noise generation would often be avoided. It will be clear that the various ways of programming this fan saves the end user power that he would rather not use or would rather dedicate to the electronics being cooled by the fan, which the electronics are, in his view, the primary product.

Use of the Zener diode 58 permits the output voltage setting resistors 59 and 64 to establish the voltage at the adjust terminal 56 independently of the Zener diode. These resistors reduce $V_{adj.}$ below the Zener voltage. Because the Zener diode's effect is not apparent to the user, the choice of resistance of the resistor 64 is simplified. The resistance can be chosen as though it is the only element connected between the adjust terminal and ground and the regulator IC behaves in just that way, the regulator output increasing with increasing resistance of the resistor 64. The maximum fan speed setting element connected between the adjust terminal and ground internally of the fan could, alternatively, be a resistor rather than the Zener diode 58, but the resistance from the adjust terminal to ground, when a speed setting external resistance 64 is connected, would be the combined resistance of the parallel resistors and less easily determined to select fan speed.

When the fan is to be the highest speed fan model of a series of fans of a particular input voltage, the highest $V_{out}$ from the regulator 53 is desired. $V_{out}$ will then be $V_s$ less the small drop, about 1.4 volts, across the IC. The Zener diode can be omitted. The $V_{out}$ can be programmed by the fan user by connection of a programming element 63 just as with the fan of FIG. 3. However, to prevent damage to the regulator IC 53, a resistor 65, shown in broken lines in FIG. 3, is connected, internally, in series between the adjust terminal 56 and the externally accessible end of the programming lead 21. This prevents the user from connecting the adjust terminal 56 directly to ground or and supply via the lead 21. An exemplary brushless DC fan with the circuit of FIG. 3 had a four pole brushless DC motor wound with 190 turns of #27 wire in each of the two windings 47 to give a 7Ω resistance for each. The pertinent circuit element values, and component identifications were as follows:

| Zener diode 58 | 1N5246 (16 V Zener voltage) |
|---|---|
| Resistor 59 | 1KΩ |
| Resistor 61 | .91 Ω |
| Diode 62 | 1N4148 |
| Transistors 73 & 74 | TIP102 (National) |
| Capacitors 78 & 79 | .01 μf. |

Fan speed and relevant voltages responded to external resistance, resistor 64, as follows:

| $V_s$ | R64 | Zener V | Adj. V | Winding V | Speed |
|---|---|---|---|---|---|
| 24 V | ∞ (open) | 16 V | 15.4 V | 17.2 V | 2900 RPM |
| 24 V | 10.4KΩ | 16 V | 12.4 V | 14.2 V | 2500 RPM |
| 24 V | 7.7KΩ | 16 V | 9.2 V | 11.4 V | 2000 RPM |

R64 = resistance of external resistor 64.
Zener V = breakdown voltage of Zener diode.
Adj. V = voltage at adjust terminal.
Winding V = voltage at node 80.

R64=resistance of external resistor 64.
Zener V=breakdown voltage of Zener diode.
Adj. V=voltage at adjust terminal.
Winding V=voltage at node 80.

Thermal protection is afforded by the regulator IC as well. Whereas, in the past, positive temperature coefficient thermistors had to be selected in dependence on the windings chosen for a particular speed, the IC 53 provides thermal protection regardless of the speed set by the speed programming components connected to the adjust terminal 56. Too great a voltage drop across the IC 53, from its input terminal 54 to its output terminal 55, initiates its thermal shut-down. In locked rotor condition, the excessive current through the current limiting resistor 61 greatly reduces the output voltage from the regulator. For a fan of a given input voltage, in a locked rotor condition, regardless of programmed output voltage and speed, excessive voltage drop across the IC will occur and cause the IC to stop conducting.

As for the switching circuit 50, it is supplied power from the line 19 via the protective diode 51 and a current limiting resistor 67. A capacitor 69 can be connected across the circuit 50's input to suppress transients if desired. A separate voltage regulator 70 supplies a commutation circuit, that includes the Hall sensor 45 of FIG. 2b. The commutation circuit 71 alternately energizes the windings 47 by switching a pair of transistors 73 and 74 into conduction by application of its alternate outputs 76 and 77 as base drives. Each of the transistors 73 and 74 can be a prepackaged Darlington pair as shown. It will be seen that the voltage regulator 53 controls the voltage applied across the windings 47, but does not affect the voltage applied to the commutation circuit 71. So the IC 53 can be freely programmed to control fan speed without concern for adversely affecting the operation of the switching circuit.

When the appropriate output voltage $V_{out}$ is substantially less than the supply voltage $V_s$ the regulator 53 supplies a constant $V_{out}$ to keep fan speed constant despite variations that may occur in $V_s$ provided that these variations do not bring $V_s$ near the chosen $V_{out}$. For example, if the fan described above is to be connected to a nominal 24 volt supply, but is to run at 2900 RPM with 17.2 V applied across the windings 47, then significant variations in $V_s$ above and below 24 V will not affect fan speed.

Thus it will be seen, the use of an internal voltage regulator in association with the motor windings of a brushless DC fan in accordance with this invention can greatly simplify fan manufacture and selection. Fan speed can be programmed as needed. Over-current protection is afforded as are thermal protection and voltage regulation.

Although particular preferred embodiments have been described, it will be appreciated that variations in these may be made without departure from the spirit and scope of the invention as defined in the appended claims.

I claim:

1. In a brushless DC motor driven, equipment cooling fan having a permanent magnet rotor in an impeller, a centrally mounted stator wound with windings, ends of the windings being electrically connected to a winding supply circuit centrally mounted with the stator, a commutation and switching circuit centrally mounted with the stator and the energization circuit, the impeller having blades supported thereon radially outward of the stator; the improvement comprising a voltage regulator having thermal protection mounted internally in the winding supply circuit and connected in current conducting relation to the windings, means connected between the voltage regulator and the windings to provide, in cooperation with the voltage regulator, current limiting of the current to the windings, voltage setting means connected to the voltage regulator to set the output voltage thereof and establish a desired fan speed, the commutation and switching circuit having input connection means for supplying current thereto independently of the voltage regulator connected in current conducting relation to the windings.

2. The fan according to claim 1 wherein the voltage setting means includes a Zener diode establishing a maximum voltage at a terminal of the voltage regulator to set maximum fan speed.

3. The fan according to claim 2 wherein the voltage setting means includes connection means connected between the voltage regulator and a location exterior of the fan for connection of at least one external voltage controlling circuit element thereto to determine fan speed by control of voltage applied to the windings by the voltage regulator.

4. The fan according to claim 1 wherein the voltage setting means includes connection means connected between the voltage regulator and a location exterior of the fan for connection of at least one external voltage controlling circuit element thereto to determine fan speed by control of voltage applied to the windings by the voltage regulator.

5. The fan according to claim 4 wherein the voltage setting means includes at least one internal circuit element connected to the voltage regulator so as to be in parallel with an external voltage controlling circuit element connected thereto by the connection means.

6. The fan according to claim 1 wherein the commutation and switching circuit includes a second voltage regulator means connected to the fan input voltage connections independently of the first mentioned voltage regulator and voltage setting means to set the voltage utilized by the commutation and switching circuit independent of voltage control by the voltage setting means and the first-mentioned voltage regulator.

7. The fan according to claim 1 wherein the means connected between the voltage regulator and the windings to provide current limiting comprises means responsive to current to the windings connected in output voltage altering relation to the voltage regulator to reduce the output voltage when current to the windings exceeds a predetermined level.

8. The fan according to claim 7 wherein the means connected between the voltage regulator and the windings includes a resistor in series between the regulator output and the windings, and a diode connected between an output voltage adjustment terminal of the regulator, to apply the voltage drop developed by current flow through the resistor in series back to the adjustment terminal when the voltage drop thus developed brings the voltage at the low voltage side of the resistor below the voltage at the adjustment terminal, to thereby reduce the regulator output voltage.

9. The fan according to claim 8 further including a lead from said adjustment terminal to the fan exterior to provide for connection of a circuit element externally of the fan to alter voltage to the windings and thereby set fan speed.

10. A brushless DC motor driven fan including a permanent magnet rotor in an impeller, a stator wound with windings to form at least one coil, fan housing means, fan circuitry housed in the fan housing means including a winding supply circuit and a commutation and switching circuit, the commutation and switching circuit including switching means for directing DC current to windings of the stator and commutation controlling means responsive to the position of the rotor to control the timing of energization of the windings of the stator, the winding supply circuit housed in the fan further including a voltage regulator integrated circuit having an output connection coupled in current conducting relation to the windings of the stator for conducting current thereto under control of the energization circuit, the voltage regulator integrated circuit having an output voltage controlling circuit element connection external of the housing of the fan for establishing the output voltage provided across the windings by the internal voltage regulator integrated circuit, whereby the voltage regulator and a selected circuit element connected externally of the fan to said circuit element connection set the fan speed.

11. The fan according to claim 10 wherein the winding supply circuit provides over current protection by limiting voltage therefrom to the windings when the current through the windings exceeds a predetermined level.

12. The fan according to claim 10 wherein the output voltage circuit element connection comprises a conductor to a location accessible externally of the fan for connecting a speed controlling circuit element externally for speed selection, and the selected circuit element connected externally comprises an output voltage controlling resistor externally connected to the voltage regulator via the output voltage controlling circuit element connection.

13. The fan according to claim 10 wherein the output voltage circuit element connection comprises a conductor to a location accessible externally of the fan for connecting a speed controlling circuit element externally for speed selection, and a remote, output voltage controlling thermistor being externally connected to the voltage regulator via the output voltage controlling circuit element connection which extends to the remote thermistor to control fan speed via the internally housed voltage regulator based on a temperature at the remote thermistor.

14. The fan according to claim 10 wherein the output voltage circuit element connection comprises a conductor to a location accessible externally of the fan for connecting a speed controlling circuit element externally for speed selection, a variable, active means for altering the voltage at a connection to the voltage regulator in voltage controlling relation thereto being externally connected to the voltage regulator via the output voltage controlling circuit element connection which extends to the remote thermistor to control fan speed via the internally housed voltage regulator in a program of various fan speeds called for by varying operation of equipment being cooled.

15. The fan according to claim 10 wherein a second, independent voltage regulator supplies the switching means and the commutation controlling means of the commutation and switching circuit.

16. A method of programming fan speed in a brushless DC motor driven fan including the steps of:
   (a) providing a brushless DC fan having a stator wound with windings, ends of the windings being electrically connected to a winding supply circuit mounted internally of the fan, a commutation and switching circuit mounted internally of the fan and including an internal voltage regulator connected in current conducting relation to the windings;
   (b) connecting a conductor to an output voltage controlling connection point of the voltage regulator;
   (c) directing the conductor to a location external of the fan; and
   (d) controlling fan speed by connecting an external circuit element to the conductor in output voltage controlling relation to the voltage regulator.

* * * * *